United States Patent [19]

Suzuki

[11] Patent Number: 5,227,622
[45] Date of Patent: Jul. 13, 1993

[54] WIRELESS INPUT SYSTEM FOR COMPUTER USING PEN POSITION DETECTION

[75] Inventor: Toru Suzuki, Kanagawa, Japan

[73] Assignee: Digital Stream Corp., Kanagawa, Japan

[21] Appl. No.: 831,944

[22] Filed: Feb. 6, 1992

[51] Int. Cl.$^5$ .............................................. G01V 9/04
[52] U.S. Cl. ....................... 250/221; 356/1; 340/707
[58] Field of Search ............. 250/561, 231.14, 237 G, 250/221; 340/707, 710; 359/157; 356/1, 152

[56] References Cited

U.S. PATENT DOCUMENTS

| | | | |
|---|---|---|---|
| 3,559,307 | 2/1971 | Barrekette et al. | 340/707 |
| 3,801,741 | 4/1974 | Ablett | 340/707 |
| 4,550,250 | 10/1985 | Mueller | 250/203 R |
| 4,688,933 | 8/1987 | Lapeyre | 340/710 |
| 4,705,942 | 11/1987 | Budrikis et al. | 340/707 |
| 5,026,153 | 6/1991 | Suzuki et al. | 356/1 |

FOREIGN PATENT DOCUMENTS

| | | |
|---|---|---|
| 0202468 | 11/1986 | European Pat. Off. |
| 2650904 | 11/1989 | France |
| 196326 | 8/1991 | Japan |

*Primary Examiner*—David C. Nelms
*Assistant Examiner*—K. Shami
*Attorney, Agent, or Firm*—Ostrager, Chong & Flaherty

[57] ABSTRACT

A wireless input device for computer comprises a pen-type input device having a source of light capable of transmitting pulses. The wireless input device further comprises an input device body including two angle detecting section, each having a light receiving element constructed so that it is rotated to the direction of the incident angle of incident light when the incident light from the source of light is detected, and a calculating section for calculating the position of the pen-type input device from the two incident angles detected by the two angle detecting sections.

7 Claims, 6 Drawing Sheets

WIRELESS INPUT SYSTEM FOR COMPUTER USING PEN POSITION DETECTION

BACKGROUND OF THE INVENTION

This invention relates to a wireless input system for a computer.

This application is related to the Japanese patent application No. 337309/1989 which was filed on Dec. 26, 1989 by the same applicant. The present invention differs from that disclosed in the above-mentioned application in the construction that the position of a pen-type input device is detected by detecting light pulses from the pen-type input device, and other constructions are substantially the same in both inventions. Therefore, the above-mentioned application is disclosed herein for reference.

Conventional input devices for computers, for example, in which icons are clicked or a cursor is moved on the display through graphics software, includes a mouse, a joy stick, a light-pen and others. However, they are all mechanically connected with wires to the bodies of the computers.

Recently, as the production of portable computers has been increased greatly, there have been increasing needs for input devices which can be used in any place. For instance, the mice which are generally used require flat surface conditions wherein the surface is smooth and the balls inside the mice do not slip on that surface. When an operator uses a lap-top computer, he cannot use a mouse. In addition to the inconvenience of carrying a computer having the input device connected by a wire, the input devices have disadvantages that their operations are hindered by obstacles on the desk or the wire becomes entangled since the wire is caused to move as the mouse moves. Furthermore, the other input devices such as joy sticks have substantially the same disadvantages as mentioned above since the input devices are mechanically connected with wires to the computers.

In the meanwhile, character recognition in which characters written on the tablet are recognized and judged to be inputted to the computer are also used instead of the keyboard in order to input information to the computer. However, even in this case, if the input to the computer is made through the wire, such an input device also has the same disadvantage as mentioned above.

As mentioned above, conventional input devices, as represented by a mouse, are limited greatly in their usages, and have a disadvantage that input of characters cannot be made without the keyboard. Furthermore, due to the presence of the wire connected to the computer, operations are troublesome and the wire can become entangled as the mouse moves. In addition, it also has the same disadvantages where input is made through a tablet for character recognition without using the keyboard.

SUMMARY OF THE INVENTION

It is, therefore, an object of the invention to provide a wireless input device for a computer which can overcome the aforementioned disadvantages arising from the existence of a connecting wire and limited operational circumstances, and can be used in any place.

It is another object of the invention to provide a wireless input device for a computer which can overcome the above-mentioned disadvantages even in the case where a character recognition system is utilized.

These objects are accomplished by a wireless input device for a computer which comprises a pen-type input device having a source of light capable of transmitting pulses, an input device body including two angle detecting section, each having a light receiving element constructed so that it is rotated to the direction of the incident angle of incident light when the incident light from said source of light is detected, and a calculating section for calculating the position of the pen-type input device from the two incident angles detected by the two angle detecting sections.

BRIEF DESCRIPTION OF THE DRAWINGS

The present invention will be now described in detail with reference to the preferred embodiments illustrated in the accompanying drawings in which:

FIG. 2 is a perspective view of the second embodiment incase where a wireless input device according to the invention is used in a personal computer having a character recognition device combined in.

DESCRIPTION OF THE PREFERRED EMBODIMENTS

Figure 1:
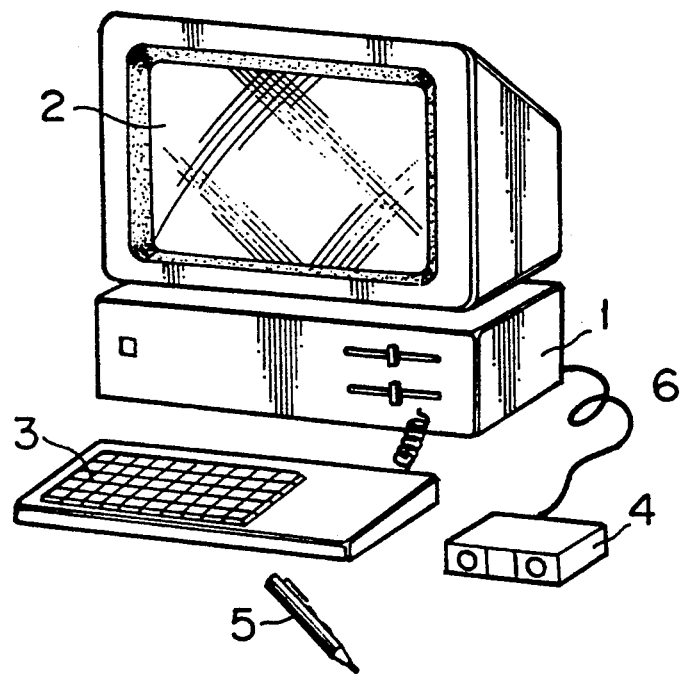
FIG. 1 is a perspective view of the first embodiment according to the present invention wherein a wireless input device comprising a pen-type unit and a wireless input unit body is used in a personal computer.
Figure 2:
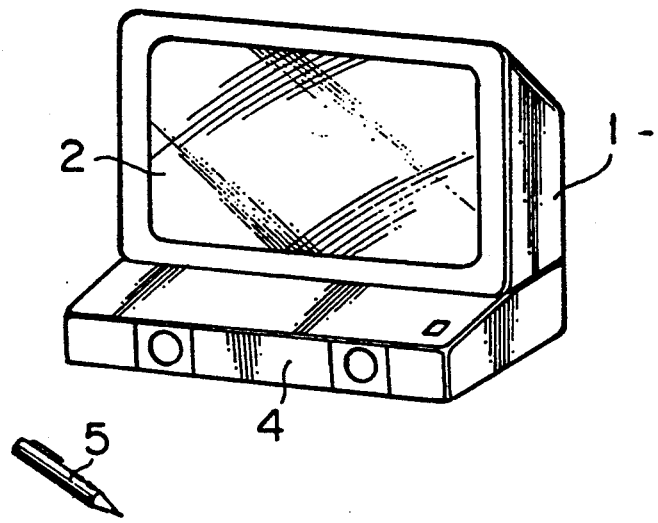

Referring now to FIGS. 1 and 2, there is shown a wireless input device for a computer which can utilize the configuration of conventional computers without any modification. In FIG. 1, a wireless input unit body 4, is supported on a suitable support such as a table and connected with a personal computer body 1 which in turn is connected with a CRT (cathode ray tube) 2 and a keyboard 3. A pen type-input unit 5 is optically associated with the input unit body 4, and the constructions of the input unit and the input unit body will be described in detail hereinafter.

FIG. 2 shows an embodiment in which a personal computer 1 having a character recognition system combined in instead of using a keyboard is used together with the input unit body 4. In this case, the input unit body 4 is constructed separately from the personal computer body 1 and is disposed in the position of a keyboard (instead of using the keyboard) or embedded in the personal computer body.

Figure 3:
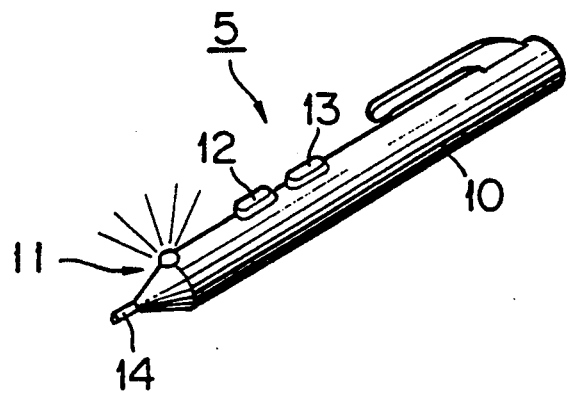
FIG. 3 is a perspective view of a pen-type input unit.

Referring now to FIG. 3, there is shown an input unit 5. The input unit 5 accommodates a battery, not shown, therein, and as described in detail in the above-mentioned Japanese patent application No. 337309/1989, the input unit 5 has power charging terminals and a guide bar, not shown. The input unit 5 has an LED (light emitting diode) 11 near its end, two click switches 12 and 13 at its middle portion and a pen-end switch 14 at its end. The LED 11 emits continuous light. Electric pulses are generated in the circuit inside of the input unit 5 and are converted into various light pulse patterns as shown in FIG. 4 in accordance with various modes such as normal mode in which all click switches are off and the pen-end switch is off, click switch on mode in which click switches 12, 13 are on, and the pen-end switch 14 on mode in which pen-end switch is on.

Figure 4:
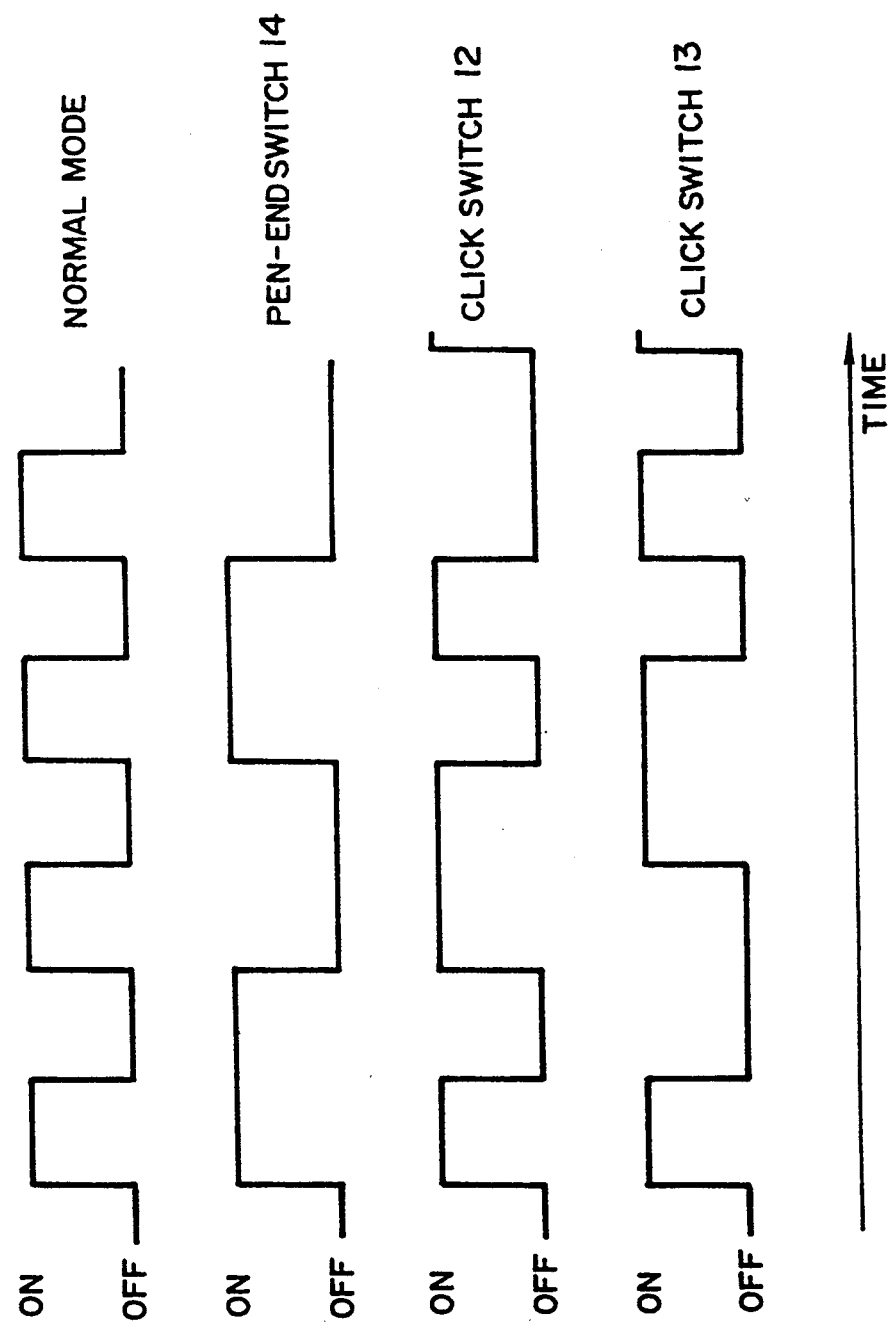
FIG. 4 is a view showing waveforms of light pulse patterns emitted from the pen-type input unit.

FIG. 4 shows various input unit patterns when light pulse is in a normal mode, when pen-end switch 14 is on, when click switch 12 is on, and when click switch 13 is on. The pen-end switch 14 is used to distinguish between the time when signals are inputted and the time when signals are not inputted, and two click switches are used to input signals of selection, cancellation and the like, as used in the normal mouse. Furthermore, either one of click switches can be used to distinguish between the time when signals are inputted and the time when signals are not inputted and in this case, the pen-end switch 14 can be omitted.

Figure 5:
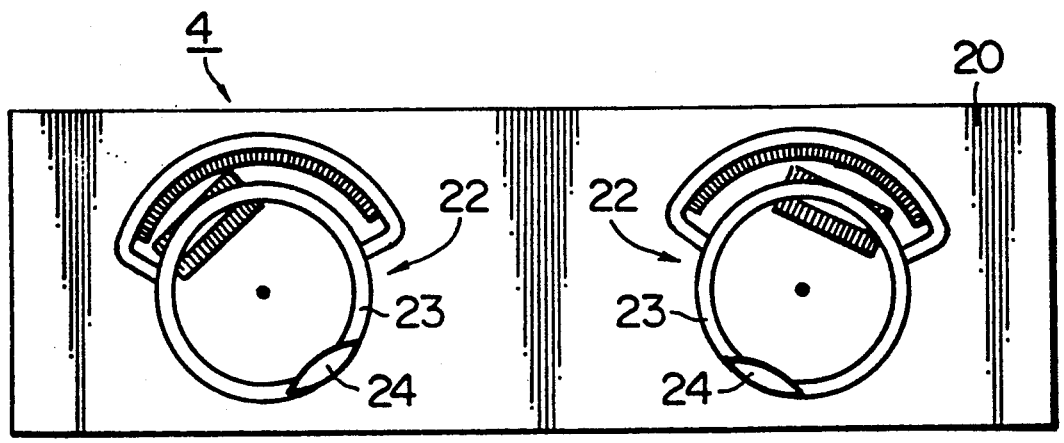
FIG. 5 is a schematic plan view showing a construction of two incident angle detecting portions.

Referring now to FIGS. 5 through 8, there are shown two incident angle detecting sections 22 disposed in the casing 20 of the input device body 4 (see FIG. 5). Since the incident angle detecting sections 22 are constructed so that one is symmetrical to the other, only one of them will be explained hereinafter.

Figure 6:
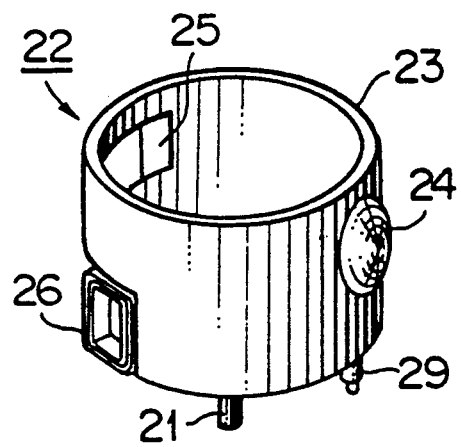
FIG. 6 is a perspective view showing each incident angle detecting portion.
Figure 7:
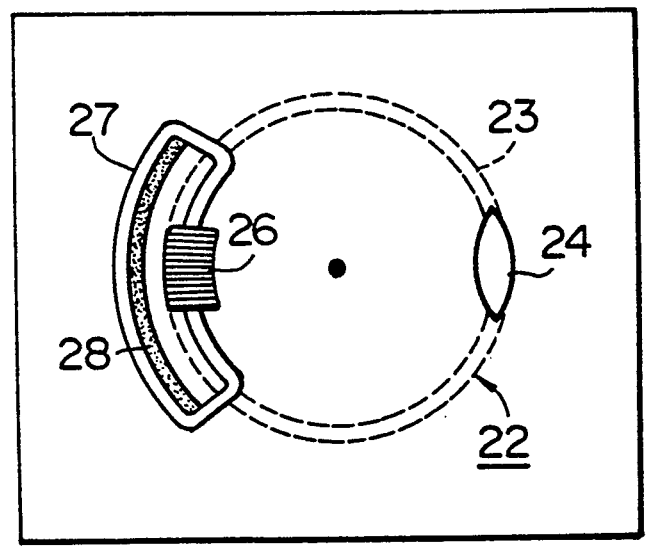
FIG. 7 is a plan view showing rotating means of the incident angle detecting portion.

As mainly shown in FIG. 6, the incident angle detecting section 22 has a substantially cylindrical frame 23. The cylindrical frame 23 is provided at its bottom wall with a shaft 21 which is supported so that the frame 23 can rotate.

A lens 24 is attached to the side wall of the frame 23 and a two-division pin photodetector (light receiving element) 25 is attached to the wall opposite to the lens 24. Further, a linear motor coil 26 is attached to the back of the wall of the frame. The linear motor coil 26 is disposed so that it is wound around a yoke 27 (see FIG. 7) which is fixed to the casing 20, and a magnet 28 is fixed to the yoke 27. Therefore, the linear motor coil 26, the yoke 27 and the magnet 28 constitutes a linear motor. The linear motor is used to rotate the frame 23 so that the difference in the quantities of light received in the two-division pin photodetector 25 becomes zero.

Figure 8:
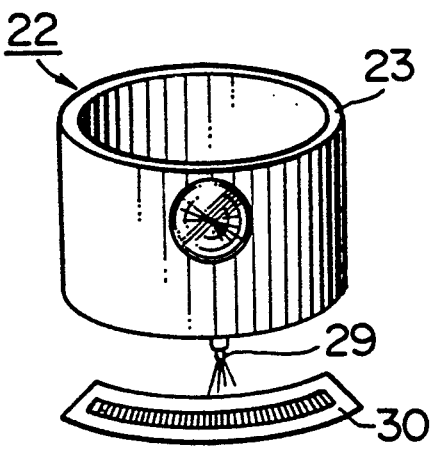
FIG. 8 is a perspective view showing rotation position detecting means of the incident angle detecting portion.

As shown in FIG. 8, a light emitting diode 29 is attached to the bottom of the frame 23, and a light receiving element such as CCD (charge coupled device) line sensor 30 is attached to the casing 20 at the position in which the light emitting diode 29 is opposite to the CCD line sensor during rotation of the frame 23.

Figure 9A:
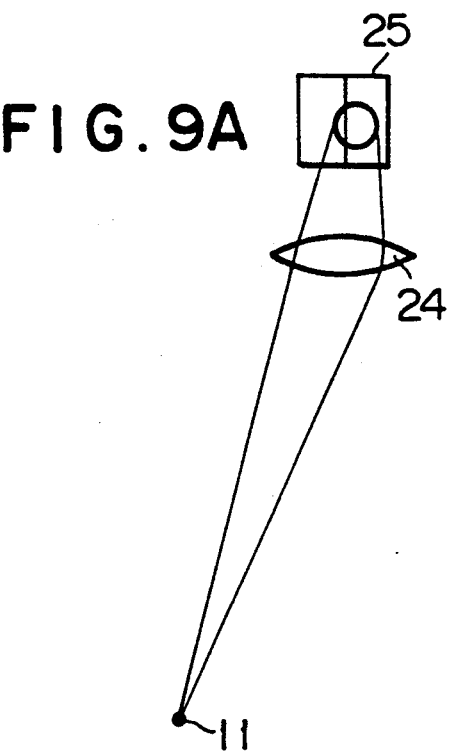
FIGS. 9A and 9B are schematic plan views for explanation of the operations of the incident angle detecting portion.
Figure 9B:
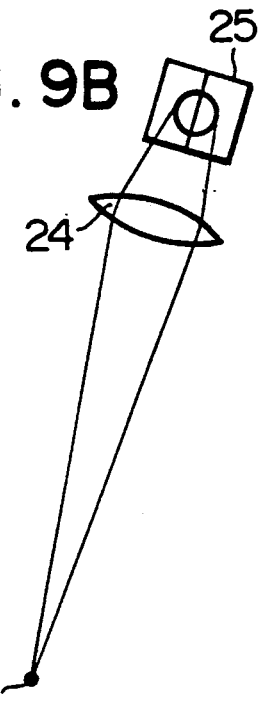

FIGS. 9A and 9B are used to explain the incident angle detecting operation of the incident angle detecting section 22. As shown in FIG. 9A, when there is difference in the quantities of the light detected by the two-division photodetector 25 where the light from the light emitting diode 11 of the pen-type input device 5 impinges on the two-division photodetector 25 through the lens 24 of the incident angle detecting section 22, the difference is detected and a current is controlled to rotate the frame 23 until the difference in the detected quantities of the light becomes zero. FIG. 9B shows the condition that the lens 24 attached to the frame and the two-division photodetector 25 are in alignment with the light emitting diode 11. As a result, the rotation position of the frame is determined and the incident angle is therefore determined on the basis of the position.

Figure 10:
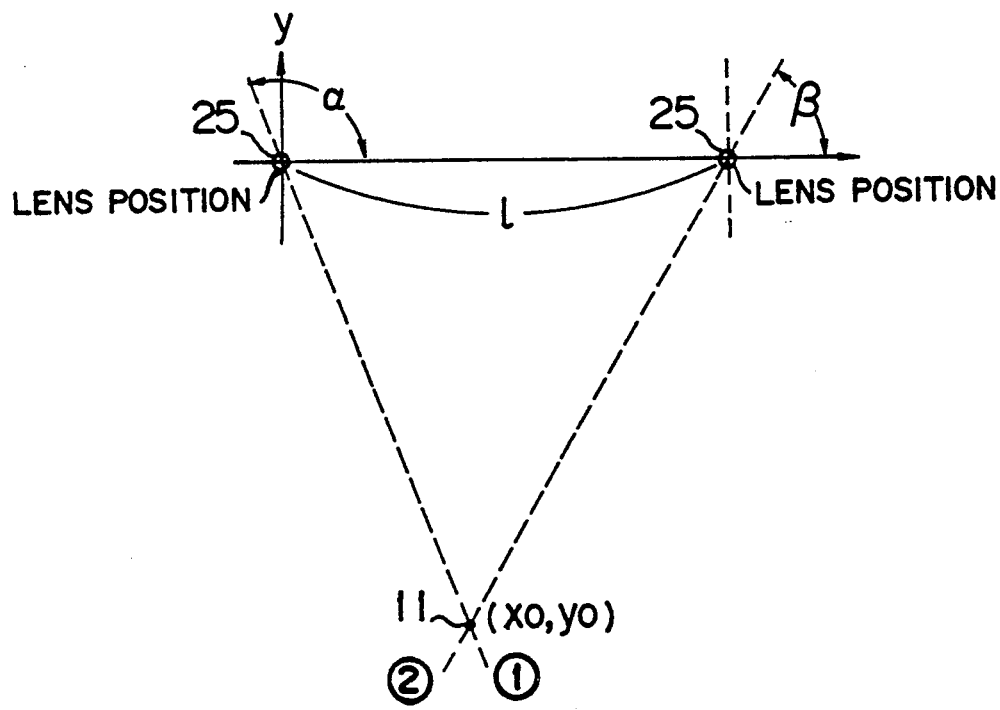
FIG. 10 is a view for explanation on calculation of the position of the pen-type input unit.

Referring now to FIG. 10, the drawing is used to explain the method of calculation for obtaining the position of the pen-type input device from the two incident angles detected.

As mentioned above, assuming that the angles detected by the incident angle detecting sections are $\alpha$ and $\beta$, and the distance between two fixed points at the incident angle detecting sections is 1, the position of the light emitting diode 11 of the pen-type input device is obtained for the intersecting point (x0, y0) by using the two equations (1) and (2), one equation (1) being for a linear line passing through the light emitting diode and one of the fixed points, and the other equation (2) being for a linear line passing through the light emitting diode and the other of the fixed points.

$$y = \tan \alpha \cdot x \quad (1)$$

$$y = \tan \beta \cdot (x - 1) \quad (2)$$

From these equations, the intersecting point (x0, y0) is determined as follows:

$$x0 = \tan \beta \cdot 1 / (\tan \beta - \tan \alpha)$$

$$y0 = \tan \alpha \cdot \tan \beta \cdot 1 / (\tan \beta - \tan \alpha)$$

Figure 11:
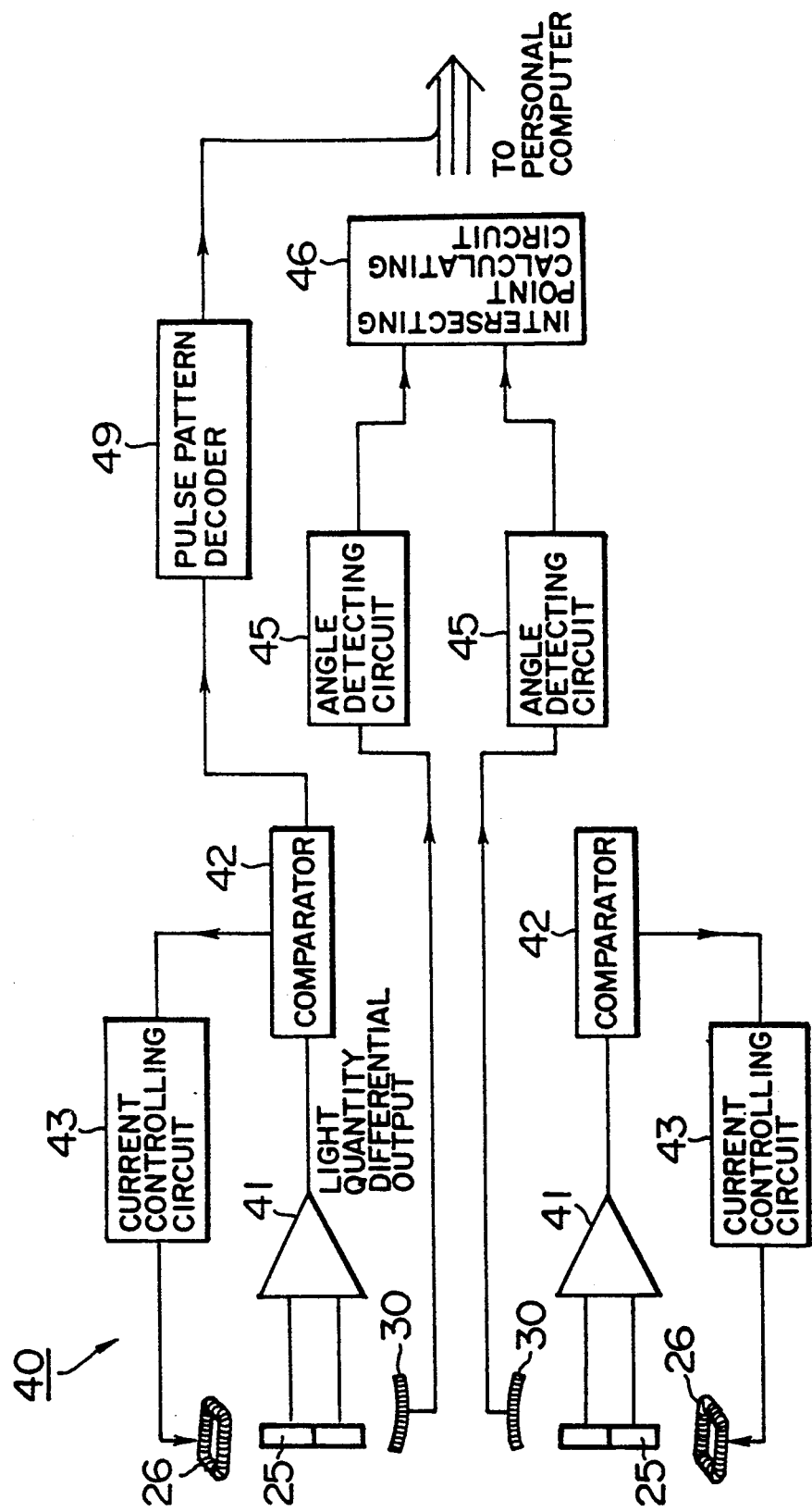
FIG. 11 is a circuit block diagram showing a construction of the input unit body.

Referring now to FIG. 11, there is shown a circuit block of the input device body. The light impinging on the two-division photodetector of one incident angle detecting section from the pen-input device 4 is inputted to a differential amplifier 41 to amplify the difference in quantities of the light and is inputted to comparator 42. The comparator 42 feeds to the linear motor coil a current in accordance with the difference in the quantities of the light, using a current control circuit 43 to control the linear motor so that the frame 23 is directed to the pen-type input device 4.

The comparator 42 feeds its output to a pulse pattern decoder 44 to discriminate whether the output is based on normal operation, click switch, or pen-end switch. The pulse pattern thus discriminated is transmitted through a cable to personal computer body.

Furthermore, an angle position signal detected by an angle sensor or CCD line sensor 30 is fed to an angle detection circuit 45, and the intersecting point or the position of the pen-type input device is obtained by an intersecting point calculating circuit 46. The obtained point is transmitted through the cable to the personal computer.

What we claim is:

1. A wireless input device for a computer comprising:
    a pen-type input device having a source of light capable of transmitting light pulses,
    an input device body including two angle detecting sections spaced apart by a given distance, each angle detecting section being located at a fixed point and including a rotatably-supported, substantially cylindrical frame, a lens attached to the frame for focusing incident light from the pen-type input device, a light receiving element in the form of a two-division photodetector attached to the frame opposite to the lens for detecting incident light focused by the lens, rotating means for rotating the frame toward a direction of incident angle of the incident light so that a difference in quantities of the incident light received by the two-division photodetector is cancelled to zero, and rotation position detecting means for detecting a rotation position of the frame upon its rotation toward the direction of the incident angle of the incident light, and a calculating section for calculating a position of the pen-type input device from the incident light detected by the two angle detecting sections, wherein said calculating section calculates the position of the pen-type input device on the basis of the two incident angles detected by the two angle detecting sections and the distance between the fixed points of the two angle detecting sections.

2. A wireless input device for a computer according to claim 1 in which said rotating means includes a linear motor comprising a coil attached to the frame, a yoke attached to the casing of the incident detecting section, and a magnet attached to the yoke.

3. A wireless input device for a computer according to claim 1 in which said rotation position detecting means comprises a LED attached to the frame, and a CCD line sensor attached to a stationary casing of the incident angle detecting section.

4. A wireless input device for a computer according to claim 1 in which said input device body is a separate member connected to the computer.

5. A wireless input device for a computer according to claim 1 in which said input device body is embedded in the computer.

6. A wireless input device for a computer according to claim 1 in which the pen-type input device comprises at least one click switch.

7. A wireless input device for a computer according to claim 6 in which the pen-type input device further comprises a pen-end switch.

* * * * *